United States Patent

[11] 3,559,755

| [72] | Inventor | Raymond B. Pond |
| | | 195 Springfield Ave., Greenfield Park, Quebec, Canada |
| [21] | Appl. No. | 754,548 |
| [22] | Filed | Aug. 22, 1968 |
| [45] | Patented | Feb. 2, 1971 |

[54] VEHICLE ANTITHEFT DEVICE
13 Claims, 6 Drawing Figs.

[52] U.S. Cl. ................................................. 180/114,
303/89; 251/137, 137/523
[51] Int. Cl. ........................................................ B60r 25/00
[50] Field of Search............................................ 180/114,
82; 188/265, 152.15(Inquired); 303/89;
137/625.25, 523; 192/3(H); 251/65, 83, 137

[56] References Cited

UNITED STATES PATENTS

| 2,585,711 | 2/1952 | Whitney et al. | 303/139X |
| 1,819,452 | 8/1931 | Wright | 251/137 |
| 2,168,774 | 8/1939 | Hurlburt | 251/83X |
| 2,310,745 | 2/1943 | Parks et al. | 251/83X |
| 2,457,739 | 12/1948 | Sherrill | 251/137X |
| 2,695,685 | 11/1954 | Jamison | 180/114X |
| 3,174,502 | 3/1965 | Howarth et al. | (180/114UX) |
| 3,361,161 | 1/1968 | Schwartz | 251/65X |
| 3,424,426 | 1/1969 | Neff | 251/137X |

*Primary Examiner*—Kenneth H. Betts
*Attorney*—Alan Swabey

ABSTRACT: An antitheft device for automobiles which includes a control valve interrupting the conduit from the master cylinder to a set of wheel brakes. The control valve includes inlet and outlet ports from the master cylinder communicating with a bore, a sliding solenoid-controlled plunger in the bore, a valve head connected to the plunger adapted to allow pressure flow to the brakes, but to prevent pressure flow back to the master cylinder when the control valve is in a locked position.

PATENTED FEB 2 1971

3,559,755

INVENTOR
Raymond B. POND

ATTORNEY

INVENTOR
Raymond B. POND

ATTORNEY

VEHICLE ANTITHEFT DEVICE

ANTITHEFT DEVICE

The present invention relates to antitheft devices and particularly to an apparatus for locking critical parts of an automobile when it is not in use. Heretofore, various antitheft devices have been developed including devices connected to the hydraulic brake system of an automobile for maintaining hydraulic pressure on the brakes when the automobile is not in use, preventing the automobile from being towed or otherwise driven away by anyone but the authorized driver, having an ignition key. Such systems to date have been of the type whereby a separate electrical circuit must be maintained opened while the automobile is not in use. Such a system will, of course, fail if this circuit is broken. Furthermore, it is a constant load on the battery. Other systems are of the mechanical-hydraulic type or are otherwise relatively complicated and not always foolproof.

It is an aim of the present invention to provide a locking apparatus associated with the hydraulic braking system of an automobile wherein the apparatus is electrically controlled, but does not require a live electrical circuit to maintain the device in a locking position. It is also an aim of the present invention to provide a locking apparatus which is relatively simple in construction and, therefore, inexpensive to manufacture.

In a construction according to the present invention, the locking apparatus includes a control valve interrupting the hydraulic fluid conduit from the master cylinder to the set of brakes. The control valve comprises a housing having a bore, an inlet port in said housing connected to the conduit leading from the master cylinder and an outlet port in the housing connected to the conduit leading to the set of brakes. The inlet and outlet ports communicate with the bore.

A valve body is movable axially within the bore, while means are provided to move the valve body between a first position and a second position. Unidirectional flow means are provided in the valve body and are operable to allow pressure flow from the master cylinder to the brakes, but prevent reverse flow from the brakes back to the master cylinder, thereby locking the brakes. A solenoid can be used to move the valve body and is energized by a switch provided on the dash of the automobile in cooperation with the ignition.

In a more specific embodiment, the unidirectional means is a valve head connected for limited axial movement to the valve body with a compression spring therebetween, and when the valve body is in its second position, the valve head is urged against a valve seat provided between the inlet and outlet ports. When pressure fluid comes from the master cylinder, it causes the valve head to force against its bias relative to the vaLve body so that fluid pressure coming from the master cylinder will pass from the inlet port to the outlet port to the brakes, but once the pressure on the master cylinder has been released, the valve head will, upon the force of the resilient means between the valve head and the plunger, engage the valve seat, preventing fluid pressure from returning from the brakes through the outlet port, thus maintaining pressure on the brake.

Furthermore, a locking unit adapted to lock the hood simultaneously with the control valve of the hydraulic brake system can be supplied. In this case, a solenoid-controlled plunger may be provided which is adapted to engage a flange of the hood when the proper electrical signal is provided and the plunger is retracted when the electrical signal to unlock the hood and brakes is given.

Having thus generally described the nature of the invention, particular reference will be made to the accompanying drawings, illustrating a preferred embodiment of the invention, and in which.

Figure 1:
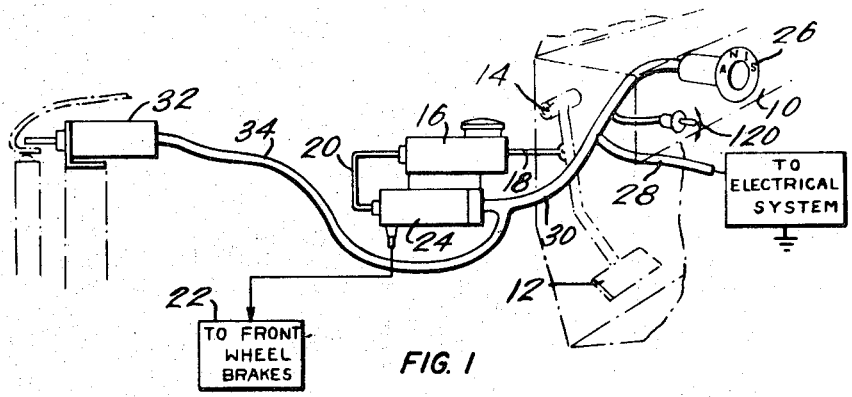
FIG. 1 is a schematic view of the locking device as it would appear in relation to various parts of an automobile shown in dotted lines.

Referring now to FIG. 1, the dash of an automobile is shown in dotted lines at 10 with the brake pedal 12 below the dash hinged at 14 to the fire wall of the automobile. On the engine compartment side of the fire wall is mounted a master cylinder 16 for the hydraulic braking system which is connected to the pivoting foot pedal 12 by means of a piston rod 18. A conduit 20 is connected at one end of the master cylinder 16 to carry fluid under pressure from the master cylinder to the front brakes 22. In this case, the conduit 20 is interrupted by a control valve 24.

Figure 2:
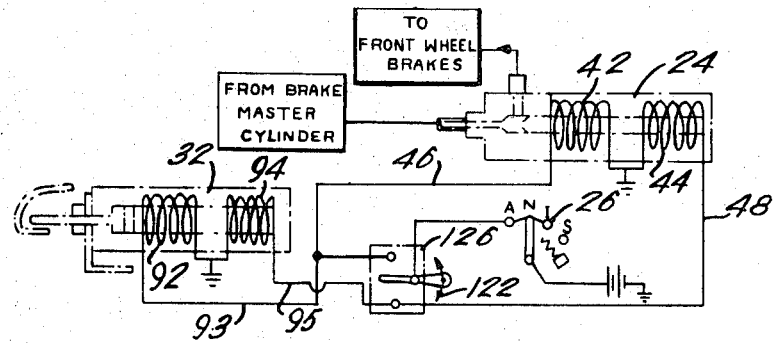
FIG. 2 is a schematic diagram of an electrical circuit which could be used with the locking device.

The control valve 24 can be electrically connected to the ignition 26 shown on the dash. The hood-locking unit as shown in FIG. 2 is connected in parallel electrically with the control valve 24.

Figure 3:
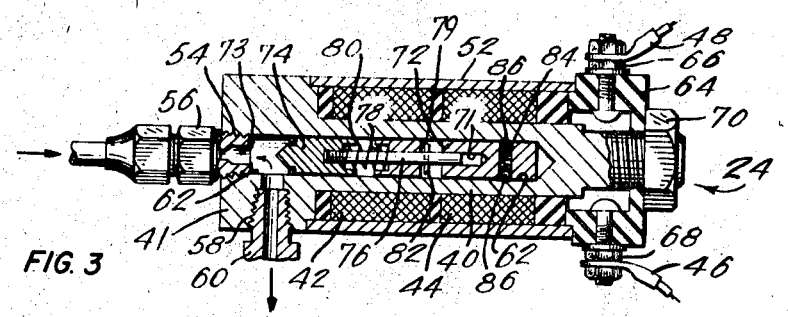
FIG. 3 is an axial sectional view of the locking control valve associated with the hydraulic braking system.

The control valve 24 is shown in FIG. 3 includes a cylindrical housing 40, which has an enlarged end 41 and a pair of spaced apart solenoid coils 42 and 44 mounted axially about the outside surface of the cylindrical body 40. Each coil is electrically connected by separate leads 46 and 48 to the dash, as will be explained later. A cylindrical cover 52 is concentric with the coils 42 and 44 and acts as a protection cover for them. The enlarged head 41 is provided with an inlet port 54 and an outlet port 58. Adapters 56 and 60 are threadedly fitted into each port respectively. These ports 54 and 58 communicate with an axially defined bore 62 which extends through the major length of the cylindrical body 40. At the other end of the cylindrical body is a plastic plug 64 which is held onto the body by a nut 70. Terminals 66 and 68 are provided on the plug connecting the leads 46 and 48.

Within the bore 62 is a valve body or plunger 72 which is adapted to slide axially in the bore 62. A valve seat 73 is define at one end of the bore opening into the inlet port 54. A valve head 74 is associated with the plunger 72 and is adapted to seat within the valve seat 73. The valve head 74 includes an elongated pistonlike rod 76 connected to the valve head 74 and extending in a bore 71 within the plunger 72. A spring 80 is provided between the valve head and the plunger 72 and seats within the well 78 provided in the plunger.

A lateral aperture 79 is provided at a point spaced away from the head of the valve 74 and extends laterally intersecting the elongated bore. A locking pin 82 is provided in the pistonlike rod 76 for engagement against the sides of the aperture 79 so as to limit the movement of the piston 76 and the valve head 74 connected thereto. Spaced from the aperture 79 is a second lateral aperture on which are mounted a pair of balls 86 on each end of a spring 84. These balls 86 are resiliently pushed outwardly of the plunger so as to engage the sidewalls of the bore 62 and they increase the frictional engagement of the plunger 72 against the bore 62.

The material of the plunger 72 is preferably made of magnetic bearing material, that is, any solid material which will respond to a magnetic field, so that it will be influenced by induction provided by the pair of coils 42 and 44.

In normal operation of the automobile, the plunger 72 is in a position as shown in FIG. 3 with the valve head 74 spaced from the valve seat 73 allowing uninterrupted flow between the inlet 54 and the outlet 58. However, on initiating an electrical circuit through the solenoid coil 42, as will be explained later, the plunger will be forced to move forward, since the induction force on it overcomes the frictional force provided by the spring-loaded balls 86. Thus, the plunger will move to a position where the valve head 74 engages the valve seat 73 interrupting the communication between the inlet 54 and the outlet 58. Even though the electrical signal may be cut instantaneously, the plunger 72, once it is moved to a forward position, will remain there because of the frictional engagement of the balls 86 on the bore wall 62 at that point.

Now if the foot pedal 12 is depressed so as to create pressure flow from the master cylinder 16 through the inlet port 54, the force of the pressure flow will be such as to push the valve head 74 off the valve seat 73, compressing the spring 80. Therefore, the plunger 72 does not move, but the valve head moves rearwardly relative to the plunger 72. Therefore, fluid pressure is allowed to pass through the outlet port 58 to the front wheel brakes 22.

As the operator removes his foot from the foot pedal 12, the pressure flow to the front brakes will be reduced and the spring 80 will force the valve head 74 back to the valve seat 73. Now there is no pressure on the side of the inlet port 54, but the fluid pressure is between the front wheel brakes and the outlet port 58. However, as can be seen, valve head 74 will prevent the pressure flow from passing to the inlet port 54, and the pressure flow and outlet port 58 are capable of moving the valve head 74 from the valve seat 73 since the pressure is at a right angle to the direction of movement of the plunger 72 and the valve head 74, and thus prevent any pressure flow from returning to the master cylinder with the result that the front brakes remain locked, even though the pressure on the foot pedal 12 has been released. Once it is required to unlock the brakes, an electrical signal is passed through the solenoid coil 44, thus moving the plunger 72 by induction in overcoming the frictional resistance offered by the spring-loaded balls 86 on the bore wall 62. The plunger will be retracted to its initial position as shown in FIG. 3 by induction, thus allowing the normal flow between the inlet port 54 and the outlet port 58.

Figure 6:
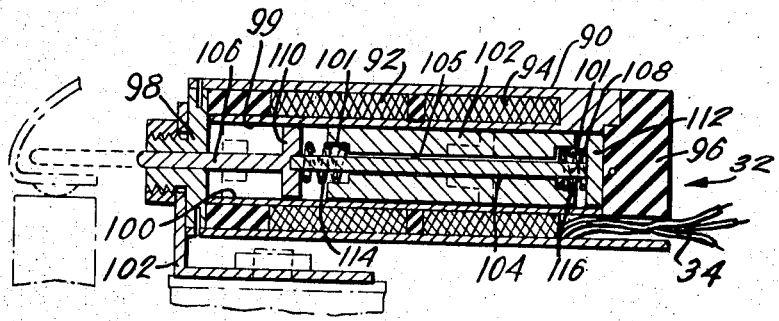
FIG. 6 is an axial sectional view of the hood-locking unit.

The hood lock 32 as shown in FIG. 6 includes a cylindrical housing 90 into which are fitted a pair of spaced apart solenoid coils 92 and 94. At one end of the housing 90 is provided a plug 96; at the other end, a cap having a neck 98 is provided. A concentric tubular member 99 is also provided defining a central bore 100 within the housing.

Within the bore 100 is a plunger 102 shaped at each end with central spring wells 101 and an axial central bore 104. A ram member including a forward ram portion 106 which protrudes out the neck 98 and a rear ram portion 108 which slides within the bore 104. On each end of the rear end portion 108 is a flange 110 and 112. Between each flange 110 and 112 are springs which seat in the spring wells 101 of the plunger 102. The flange 110 limits the outward axial movement of the forward ram portion 106 as well as providing an abutment plunger 102. The plunger 102 is of a magnetic bearing material which, by induction, moves forward upon energizing the coil 92 and hits the flange 110 which is normally spaced from it, causing the forward ram portion 106 to protrude out of the neck 98 to engage the hood flange. When it is required to release the hood, a momentary electrical signal is sent to the solenoid coil 94 which actuates the plunger 102 to slide rearwardly ramming against the flange 112 and forcing the rear ram portion 108 and the forward ram portion 106 connected thereto to retract to within the hood lock device.

Referring now to FIGS. 1 and 2, the electrical control of the control valve 24 and the hood lock device 32 will be more fully explained. When it is required to leave the automobile unattended, the operator deflects his key in the ignition to the counterclockwise direction towards the accessory slot. This accessory slot or a further slot provided on the ignition switch is adapted as shown in FIG. 2 to complete the current from the battery through the circuit to the toggle switch 120. As soon as the key is turned to the accessory slot, the toggle switch 120 on the dashboard is operated manually to a first position which is a lock position, denoted as 122. Once the toggle is in the position 122, current passes through the leads 46 to the solenoid coil 42 in the control valve 24 and also in a parallel electrical circuit through the lead 93 to the coil 92 in the hood lock device 32. As described earlier, the valve head 74 will then be seated in the valve seat 73 interrupting the flow from the front brakes to the master cylinder 16, although allowing flow from the master cylinder to the front brakes and forcing the forward ram 106 outwardly from the hood lock device 32 into a suitable flange in the hood as shown in dotted lines in FIGS. 1 and 6.

As also described earlier, as the operator depresses the foot pedal, pressure flow will pass through the front brakes, and will remain under pressure on the front brakes, thus locking the brakes and preventing the car from being moved.

When it is required to deactivate the locking system and allow the car to be moved, the ignition key is again turned counterclockwise to the accessory position, allowing current to pass through the locking circuit. The toggle switch is then moved to the second position which is the unlocked position 126, which allows current to pass through the leads 48 and 95 to the rear solenoid coils 44 and 94, in the control valve 24 and the hood lock unit 32 respectively, thus retracting the plunger 72 and the valve head 74 from the valve 73 and the forward ram portion 106 from the hood flange.

Of course, the current need only be momentary, since once the movements have occurred, the key can be removed from the ignition, thus cutting the current to the various coils in the locking system.

Figure 4:
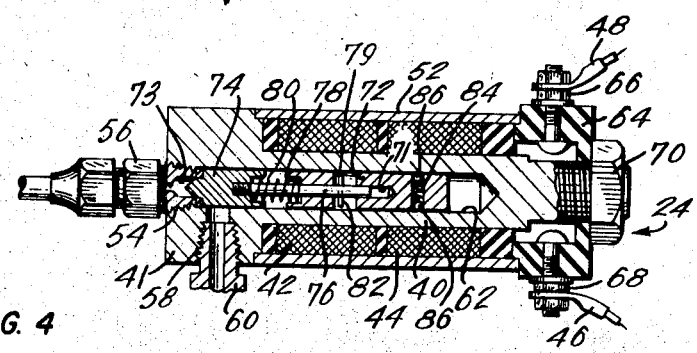
FIG. 4 is a partial sectional view similar to FIG. 3, but showing the moving elements of the control valve in a different position.
Figure 5:
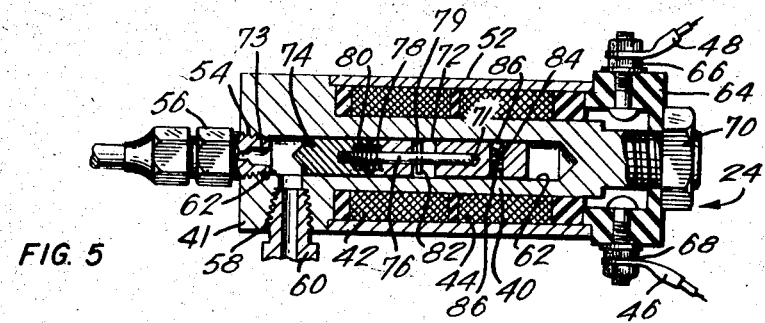
FIG. 5 is yet another partial sectional view of the control valves shown in FIGS. 3 and 4, showing the moving parts in yet another position.

Referring now to the embodiment shown in FIG. 7, the like elements as shown in the embodiments of FIGS. 3 through 5 are the same except they have been raised by 200.

I claim:

1. A control valve comprising:
   a. a housing having a bore therein;
   b. at least an inlet and outlet port in said housing communicating with said bore;
   c. valve means slidable within said bore between a first position clear of said inlet and outlet ports and a second position between said inlet and outlet port;
   d. means for moving said vaLve means from said first position to said second position;
   e. holding means for holding said valve means in said closed position; said valve means including unidirectional flow means operable to allow pressure flow from said inlet port to said outlet port, but to prevent reverse pressure flow from said outlet port to said inlet port when said valve means is in a second position.

2. A control valve as defined in claim 1 wherein said valve means including said unidirectional flow means comprises a valve body slidable within said bore and a valve head connected axially to said valve body for relative limited movement therewith and resilient means between said valve head and said valve body urging said valve head away axially from said body.

3. A control valve as defined in claim 1 wherein said inlet port is located axially with respect to said bore, said outlet port is at a right angle to the axis of said bore; a valve seat is provided in said housing between said inlet port and said outlet port for cooperation with said valve means.

4. A control valve as defined in claim 3 wherein said valve means including unidirectional flow means includes a valve body slidable within said bore and a valve head connected thereto for limited relative movement, and resilient means between said valve head and said valve body urging said valve head away axially from said body, whereby said valve head engages said valve seat, when said valve means are in said second position and whereby the pressure flow from said inlet port will overcome the resilient means forcing the valve head towards the valve body to allow flow from said inlet to said outlet port, but fluid pressure in the direction of said inlet port from said outlet port will be interrupted by said valve head engaging said valve seat, under the force of said resilient means.

5. A control valve as defined in claim 1 wherein the means for moving said valve means from said first position to said second position comprises a solenoid concentric with the bore of said housing and whereby a portion of said valve body is of a magnetic bearing material.

6. A control valve as defined in claim 5 whereby a pair of solenoid coils are provided concentric with said bore, whereby when the first solenoid is energized, the valve means will move from said first position to said second position and alternatively when the second solenoid is energized, the valve means will move from said second position to said first position.

7. A control valve as defined in claim 1 wherein the holding means comprises a pair of balls diametrically sandwiching a compression spring in a diametrically extending aperture in the valve body, whereby the balls are urged against the walls of the said bore.

8. A control valve as defined in claim 6 whereby means are provided for energizing each solenoid and said means includes means for supplying a current, means for directing said current alternately to one coil or the other momentarily.

9. A locking device for an automobile, valve means associated with the hydraulic braking system which includes a master cylinder and conduits leading from the master cylinder to a predetermined set of brakes on the automobile, said control valve means interrupting said conduit, including a housing having a bore therein, at least an inlet and an outlet port in said housing communicating with said bore; valve means slidable within said bore between a first position clear of said inlet and outlet ports and a second position between said inlet and outlet ports, means for moving said valve means from said first position to said second position, holding means for holding said valve means in said closed position, said valve means including unidirectional flow means operable to allow pressure flow from said inlet port to said outlet port, but to prevent reverse pressure flow from said outlet port, when said valve means is in a second position.

10. A locking device for an automobile as defined in claim 9 wherein a further locking unit is provided which cooperates with the hood and includes a housing, ram means slidable within the housing and adapted for movement between a first position retracted within the housing and a second position protruding from said housing and engaging the hood.

11. A locking unit, as defined in claim 10 wherein means for moving the ram means from a first position to a second position includes a solenoid, and a portion of said ram means is of magnetic bearing material.

12. A control valve comprising:
a. a housing having a bore therein;
b. inlet and outlet ports in said housing communicating with said bore;
c. a valve seat in said housing intermediate said inlet and outlet ports;
d. first valve means including:
1. a body portion of magnetic bearing material slidable in said bore;
2. a valve head portion connected thereto for engagement with said valve seat; and
3. first resilient means biased between said body portion and said head urging the head away axially relative to said body for limited movement;
e. first and second solenoid means spaced apart axially with said first solenoid means being located between said valve seat and the second solenoid means;
f. means for alternatively energizing said first and second solenoid means;

whereby when said first solenoid is energized, said valve body will be moved into a position such that the valve head is resiliently urged onto said valve seat whereby said pressure fluid in the direction of said outlet port from said inlet port will overcome the resilient means to open fluid pressure communication, but fluid pressure in the direction of said inlet port from said outlet port will be interrupted by said valve head engaging said valve seat, and whereby when said second solenoid is energized, said valve body will move axially away from said valve seat disengaging said valve head from said valve seat and unopposed to the fluid pressure communication between said inlet and outlet ports.

13. In a locking device for an automobile, valve means associated with the hydraulic braking system including a master cylinder and conduits leading from said master cylinder to a predetermined set of brakes of the automobile, said valve means interrupting said conduit and including a housing having a bore, an inlet port in said housing connected to the conduit portion, leading from said master cylinder and an outlet port in said housing connected to the conduit leading to the set of brakes, the inlet and outlet ports communicating with the bore, a valve seat within the housing and between the inlet and outlet port, a solenoid-operated plunger movable axially with the bore towards and from the valve seat; a valve head connected to said plunger and adapted for limited axial movement relative thereto; resilient means biasing said head away from said plunger; solenoid-energizing switch means for actuating said solenoid-operated plunger to slide to a position whereby said valve head engages said valve seat, whereby fluid pressure from said master cylinder to said brakes through said inlet overcomes the force of said resilient means disengaging said valve head from the valve seat and moving the valve head inwardly relative to the plunger permitting the flow of pressure fluid to the brakes, but whereby the valve head is resiliently forced back into engagement with the valve seat when the fluid pressure from the master cylinder is reduced, thus interrupting the fluid pressure flow from the brakes returning to the master cylinder through the outlet port, thus retaining fluid pressure on the brakes and preventing movement of the automobile until said solenoid-energizing switch operates to retract the solenoid-operated plunger.